United States Patent [19]

Maeda et al.

[11] Patent Number: 4,941,207

[45] Date of Patent: Jul. 10, 1990

[54] STRUCTURE FOR WIRELESS COMMUNICATION IN AN ELECTROMAGNETICALLY SHIELDED BUILDING

[75] Inventors: Takamasa Maeda; Hisashi Ishikawa, both of Mitaka, Japan

[73] Assignee: Nihon Musen Kabushiki Kaisha, Mitaka, Japan

[21] Appl. No.: 22,646

[22] Filed: Mar. 6, 1987

Related U.S. Application Data

[63] Continuation-in-part of Ser. No. 605,924, May 1, 1984, abandoned.

[51] Int. Cl.⁵ .................................................. H04B 9/00
[52] U.S. Cl. .............................. 455/617; 174/35 MS; 250/517.1; 343/841; 381/79; 455/41; 455/55; 455/300; 455/600
[58] Field of Search ................. 250/515.1, 517.1; 174/35 MS; 455/300, 41, 55, 606, 607, 600, 617; 381/79; 379/55; 343/720, 841

[56] References Cited

U.S. PATENT DOCUMENTS

| 2,992,425 | 7/1961 | Pratt | 174/35 MS |
|---|---|---|---|
| 3,295,002 | 12/1966 | Amans | 174/35 MS |
| 3,305,623 | 2/1967 | Bakker et al. | 174/35 MS |
| 3,323,063 | 5/1967 | Walker et al. | 343/720 |
| 3,334,597 | 8/1967 | Ruskin et al. | 250/517.1 |
| 3,531,577 | 9/1970 | Garlington | 174/35 MS |
| 3,594,490 | 7/1971 | Mitchell | 174/35 MS |
| 4,412,255 | 10/1983 | Kuhlman et al. | 174/35 MS |
| 4,474,676 | 10/1984 | Ishino et al. | 174/35 MS |
| 4,613,530 | 9/1986 | Hood et al. | 174/35 MS |
| 4,668,958 | 5/1987 | Keiser | 343/841 |

FOREIGN PATENT DOCUMENTS 0047743  4/1980  Japan ...................................... 455/55

Primary Examiner—Douglas W. Olms
Assistant Examiner—L. Van Beek
Attorney, Agent, or Firm—Burns, Doane, Swecker & Mathis

[57] ABSTRACT

A structure for wireless communication in an electromagnetically shielded building has an outer wall made of an electromagnetically shielding material such as concrete or an electrically conductive material. The outer wall has a window composed of a glass pane with an electromagnetically shielding material coated thereon or mixed therein. The outer wall and the window are grounded, and jointly define an electromagnetically shielded space in which wireless transmission/reception devices are disposed. Wireless communication is effected between the wireless transmission/reception devices by radio waves in a selected frequency range and of a selected power output.

15 Claims, 12 Drawing Sheets

STRUCTURE FOR WIRELESS COMMUNICATION IN AN ELECTROMAGNETICALLY SHIELDED BUILDING

This application is a continuation-in-part of U.S. application Ser. No. 605,924 filed May 1, 1984 now abandoned.

BACKGROUND OF THE INVENTION

The present invention relates a structure for wireless communication in an electromagnetically shielded building, and more particularly to a structure for wireless communication in a building with its interior space electromagnetically shielded from the exterior space thereof so that the radio waves propagating in the exterior space are preventing from intruding into the interior of the building and those propagating in the interior space are prevented from leaking out to the exterior space, thereby making it possible to select wavebands freely within the building or on each of floors of a tall multistory building or in each of rooms of the building for wireless communication.

Generally, where wireless communication is effected only within a building by means of wireless devices disposed in the building, the radio waves transmitted from the exterior space of the building tend to intrude into the building through the windows even through the walls of the building are made of materials such as concrete which attenuate and cut off the ratio waves, for the windows are composed of glass panes which are not electromagnetically shielded. Further, when the transmitting output power of a wireless device located in the building is increased, the radio waves from the wireless device are radiated out of the building through the electromagnetically unshielded window glass panes and interfere with radio waves outside of the building. In case the output power of a wireless device is such that the radio wave transmitted therefrom has a field intensity lower than a certain level, it is impossible to obtain a sufficient S/N (signal to noise) ratio by means of communication systems utilizing common modulation methods, resulting in deteriorated communication quality. To avoid this disadvantage, wireless devices of higher output power become necessary. The supply and demand in the VHF and UHF frequency ranges which can preferably be used by these high power wireless devices, however, are so tight that it is difficult to use wireless devices in these frequency bands which realize high quality communication.

SUMMARY OF THE INVENTION

The present invention has been done principally to overcome the disadvantages as mentioned above. Thus it is an object of the present invention to provide a structure for wireless communication in an electromagnetically shielded building, wherein frequency ranges can freely be selected in the interior space of the building for effective wireless communication by electromagnetically shielding the interior space from the exterior space of the building which has electromagnetically shielded glass panes as the windows thereof, and also by positively draining the energy of radio waves to ground.

Another object of the present invention is to provide a structure for wireless communication in an electromagnetically shielded building, comprising an outer wall made of an electromagnetically shielding material and a window composed of a glass pane including an electromagnetically shielding member, the outer wall and the window jointly defining an electromagnetically shielded space, the window comprising components connected to ground, an entrance/exit opening made of an electromagnetically shielding material for entering and leaving the space, a central wireless transmission/reception apparatus disposed in the space, and a wireless communication terminal disposed in the space, the arrangement being such that wireless communication can be effected between the central wireless transmission/reception apparatus and the wireless communication terminal with radio waves in a selected frequency range within the space.

The above and other objects, features and advantages of the present invention will become more apparent from the following description when taken in conjunction with the accompanying drawings in which preferred embodiments of the present invention are shown by way of illustrative example.

DETAILED DESCRIPTION OF THE PREFERRED EMBODIMENTS

Figure 1:
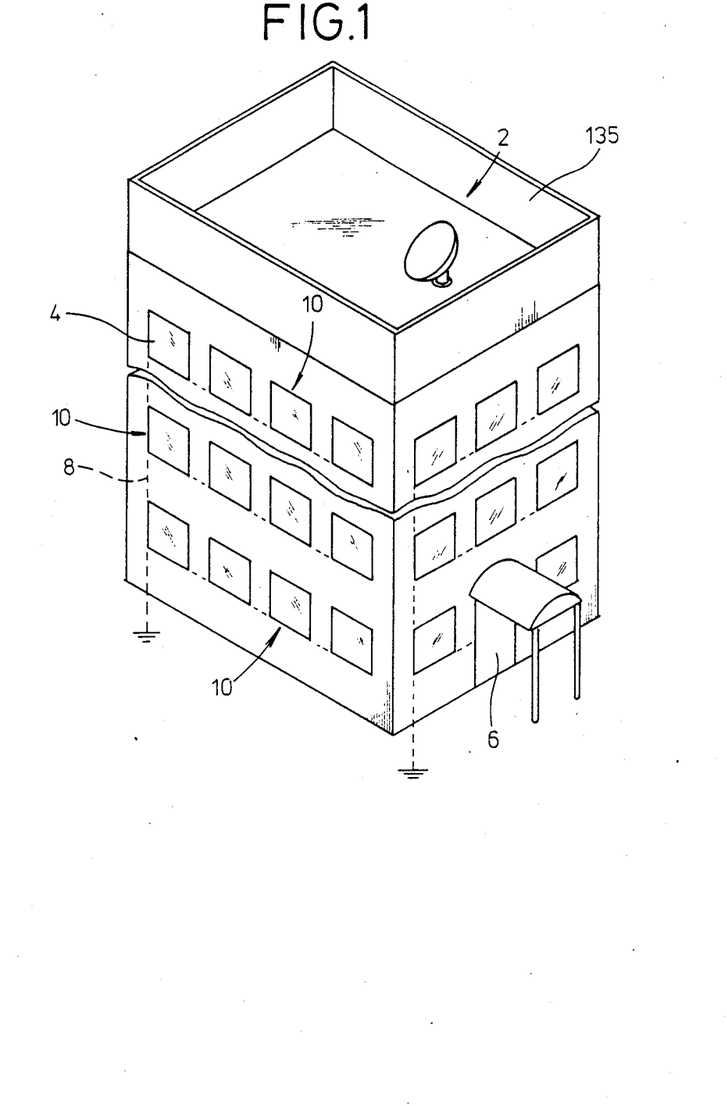
FIG. 1 is a perspective view of an electromagnetically shielded building according to the present invention.
Figure 2:
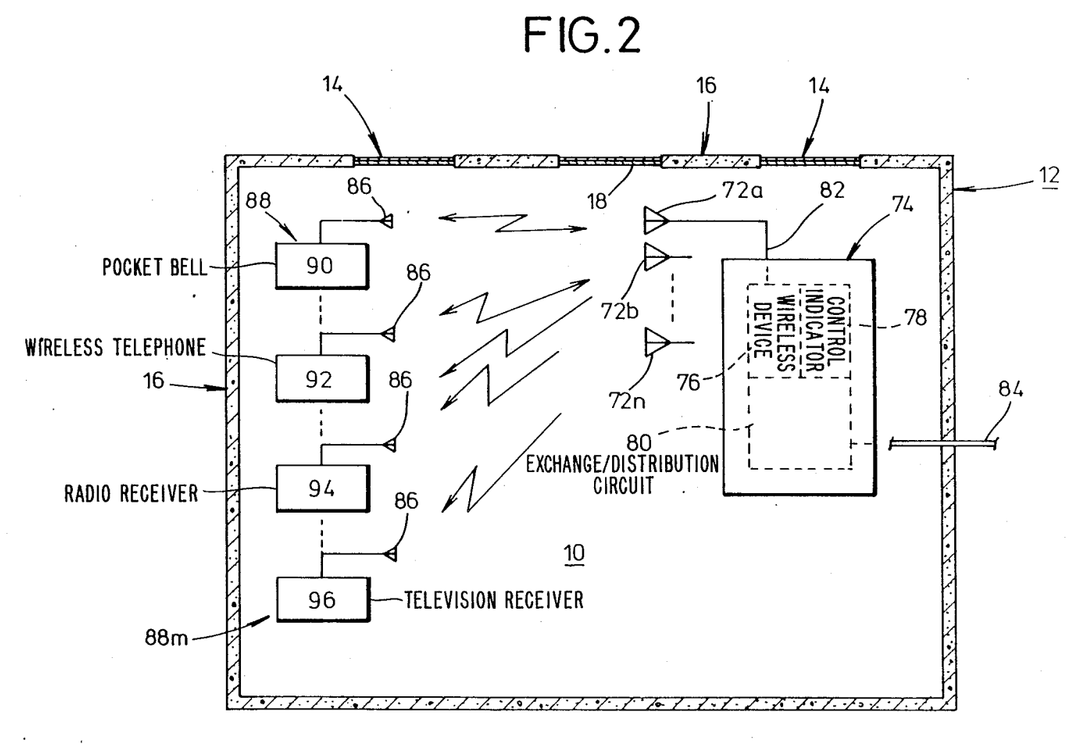
FIG. 2 is a horizontal cross-sectional view of the electromagnetically shielded building with wireless communication devices disposed therein.

FIG. 1 illustrates a building 2 having surrounding outer walls made of concrete, for example, which shield radio waves. The electromagnetically shielded building 2 has a number of windows 4 and a number of doorways 6. The windows 4 and the doorways 6 have frames constructed of electrically conductive members and grounded by electrically conductive rods or wires 8. The building 2 has a plurality of floors 10. As shown in FIG. 2, window panes 14 of glass are fitted in outer walls 16 of each floor for admitting sunlight into the building 2 in order to allow people to do work or perform some business activities on the floor. The window panes 14 of the building 2 serve to let sunlight enter the building 2 and also to shield the interior space of the building 2 from radio waves outside of the building 2, as described later on. If an exchange of air is necessary between the interior space on the floor and the exterior space of the building for ventilation purpose, therefore, it is generally preferable that a separate ventilating device be provided since the window panes 14 are incapable of being opened and closed and the interior and exterior of the building 2 can easily be shielded from each other.

It is common practice in recent years to effect ventilation in the building while keeping the windows closed for making the hygienic environment more satisfactory. Therefore, it is very easy to construct windows which cannot be opened and closed while utilizing them only as mediums for admitting sunlight. Each of the window panes 14 of glass may comprise a glass pane 18 with layers of an electromagnetically shielding material being applied thereto, or two glass panes 18 sandwiching therebetween a layer of an electromagnetically shielding material. The window glass panes which can be employed in the present invention may be constructed as glass panes 18 which will be described below.

Figure 3:
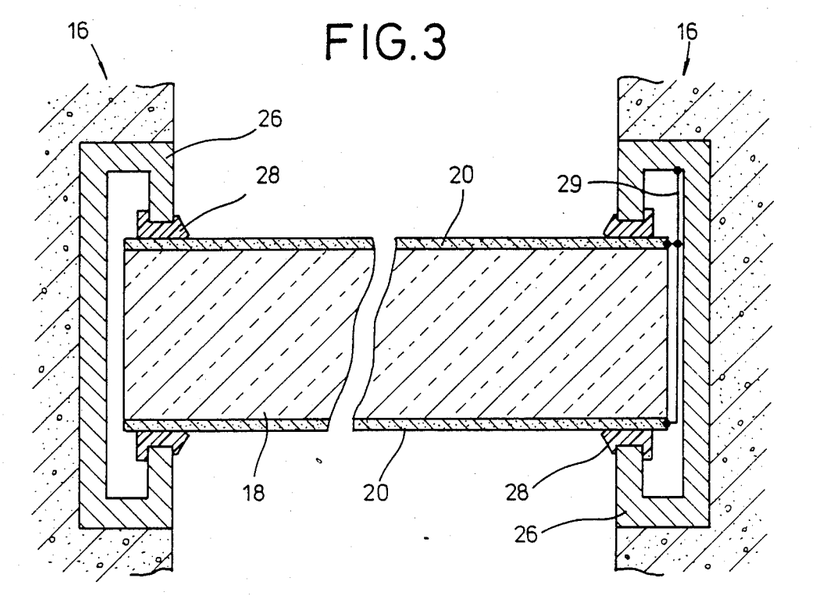
FIG. 3 is an enlarged fragmentary cross-sectional view of a window that can be incorporated in the electromagnetically shielded building shown in FIGS. 1 and 2, the window comprising a transparent or semitransparent pane of glass with fine particles made of, or a film containing, an electromagnetically shielding material being applied to the surfaces thereof.
Figure 4:
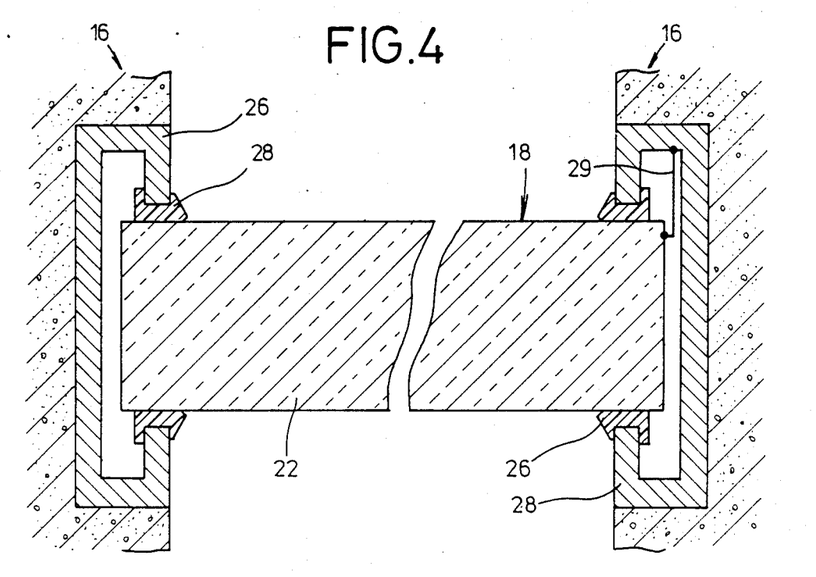
FIG. 4 is an enlarged fragmentary cross-sectional view of a window that can be incorporated in the electromagnetically shielded building shown in FIGS. 1 and 2, the window comprising a transparent or semitransparent pane of glass with fine particles made of an electromagnetically shielding material being mixed therein.

In order to use a glass pane 18 as an electromagnetically shield, ultrafine particles 20 of tin oxide having diameters ranging from 0.02 to 0.1 micrometer, or a film containing such ultrafine particles of transparent tin oxide, is applied to a surface or surfaces of the glass pane 18. Alternatively, such ultrafine particles are mixed in the glass pane 18. The glass pane 18 thus arranged can be of a considerable degree of transparency for the admission of sunlight. One example of tin oxide materials used for the ultrafine particles may be an oxide of indium tin.

Where a glass pane having a degree of transparency similar to that of ground glass is employed as a glass pane 18, ultrafine particles 20 having a diameter which is ten times that of the aforesaid ultrafine particles, or a film 20 containing such ultrafine particles, is applied to the surfaces of the glass pane 18 (FIG. 3), or such ultrafine particles are mixed in the glass pane (FIG. 4). Alternatively, an electromagnetically shielding paint such as a nickel-acryl paint is sprayed onto the surfaces of a glass pane for use as the windows 14. In such an alternative, the radio wave attenuatin factor is 25 dB or more if the paint layer is of a thickness of about 70 micrometers and the frequency of a radio wave to be attenuated is 1000 MHz. Therefore, the paint coating has a sufficient electromagnetic shielding capability.

Figure 5:
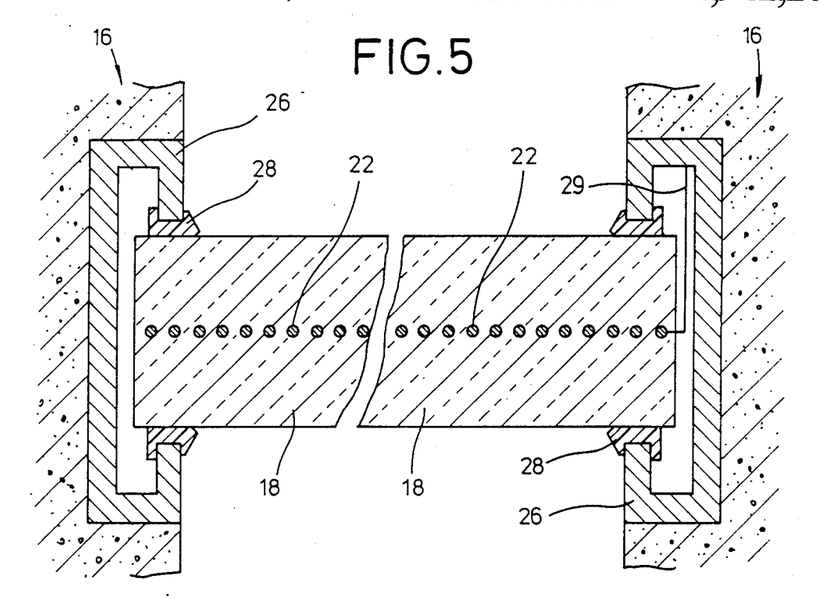
FIG. 5 is an enlarged fragmentary cross-sectional view of a window that can be incorporated in the electromagnetically shielded building shown in FIGS. 1 and 2, the window comprising a transparent or semitransparent pane of glass with nets of an electrically conductive material being embedded therein.
Figure 6:
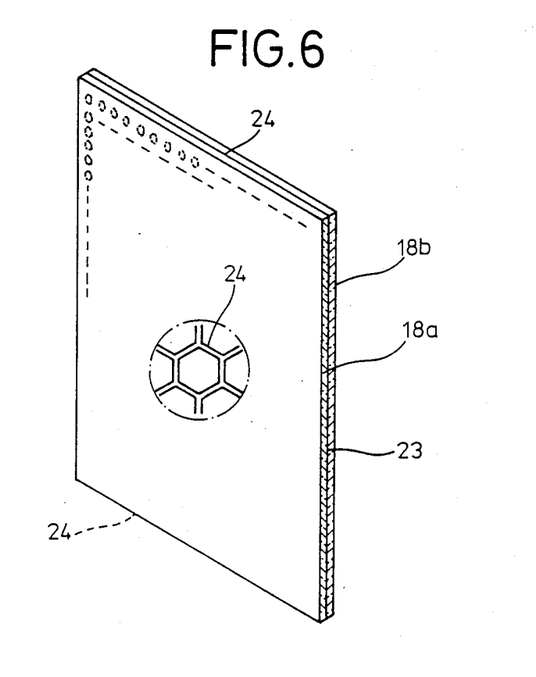
FIG. 6 is a perspective view of a window that can be incorporated in the electromagnetically shielded building shown in FIGS. 1 and 2, the window comprising transparent or semitransparent panes of glass with a punched or perforated metal plate of an electromagnetically shielding material being disposed therebetween.

According to other embodiments, a net 22 of an electrically conductive material is embedded in a single glass pane 18 (FIG. 5), and a punched or perforated metal plate 24 of an electrically conductive material, with a number of holes defined therein, is sandwiched between two glass panes 18a, 18b (FIG. 6). The net 22 or the punched metal plate 24 has the same electromagnetically shielding effect as those of the foregoing embodiments.

Figure 7:
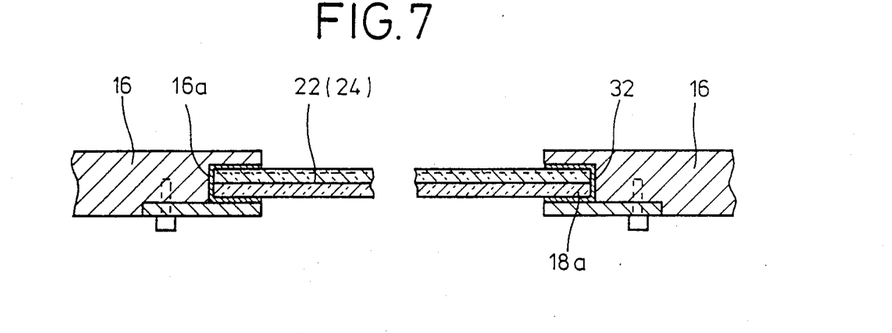
FIG. 7 is a fragmentary cross-sectional view of a window that can be incorporated in an electromagnetically shielded building, the window comprising transparent or semitransparent panes of glass with an electrically conductive member made of an electromagnetically shielding material being disposed therebetween the electrically conductive member being electrically connected to an outer wall which is made of an electrically conductive material.

The electrically conductive member 20, 22 or 24 combined as an electromagnetically shielding element with the glass pane 18 is held by a window frame 26 (FIGS. 3, 4, and 5) made of an electrically conductive material such as a metallic material such as aluminum, which has electromagnetically shielding capability. More specifically, the window frame 26 has an elongate rectangular cross section having a recess in which the glass pane 18 is fitted edgewise. The glass pane 18 is supported in the window frame 26 by means of beads 28 made of synthetic resin containing electrically conductive fine particles and disposed between the glass pane 18 and the window frame 26. As another embodiment, it is preferable for the electrically conductive member 20, 22 or 24, or the glass pane 18 with electromagnetically shielding ultrafine particles mixed therein as shown in FIG. 4, to be electrically connected to the window frame 26 through wires 29, which are grounded by the wires 8 as shown in FIG. 1 for draining the energy of radio waves to ground. In order to drain radio wave energy to ground, the outer walls 16 or the window frames themselves may be constructed of an electrically conductive material which has a relatively small degree of electric resistance, as shown in FIG. 7. In such a case, the outer walls 16 are formed as electrically conductive panels each having a recess 16a in an edge thereof. The net 22 or projections 18a of the glass panes 18 sandwiching the punched metal plate 24 are fitted in the recess 16a. The net 22 or the punched metal plate 24 is electrically connected to the electrically conductive outer walls 16. Preferably, an electrically conductive panel 32 is interposed between the bottom of the recess 16a and the projections 18a, and an adhesive with an electrically conductive material mixed therein is placed between the outer wall 16 and the panel 32. Alternatively, the outer walls 16 and the glass pane 18 may be fastened together by means of electrically conductive bolts.

Figure 8:
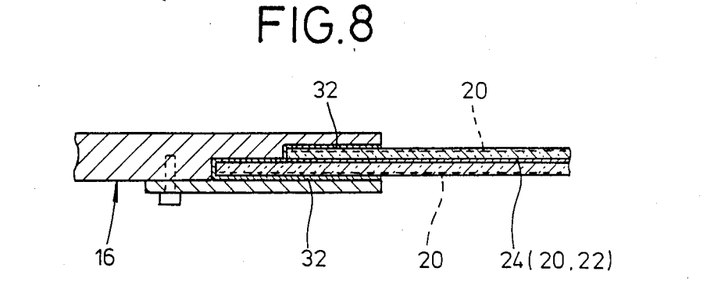
FIG. 8 is a fragmentary cross-sectional view of a window according to a modification of the arrangement shown in FIG. 7, showing the structure in which a glass pane of the window engages an outer wall made of an electrically conductive material.

FIG. 8 shows another arrangement in which an outer wall 16 is coupled to a glass pane 18 with a punched metal plate 24 embedded as an electromagnetically shielding member therein. The outer wall 16 has two contiguous steps 16b, and the glass pane 18 also has two complementary contiguous steps 18b. The steps 16b, 18b are complementarily fitted together, and an electrically conductive panel 32 is disposed between the interfitted steps 16b, 18b. An adhesive containing an electrically conductive material is applied to fasten the panel 32 to the outer wall 16 and the glass pane 18. Since the area of contact between the glass pane 18 and the outer wall 16 is increased because of the steps 16b, 18b, the contact resistance between the outer wall 16 and the glass pane 18 is reduced and radio wave leakage is prevented. Thus, noise is effectively prevented from being produced when wireless communication is carried out in the electromagnetically shielded building 2. While the punched metal plate 24 is disposed in the glass pane 18 in the embodiment of FIG. 8, it is also possible to employ a glass pane 18 with a net 22 disposed therein or a glass pane 18 to which there are laminated electrically conductive members 20 made as of an oxide of indium tin, as shown in FIG. 3.

Figure 9:
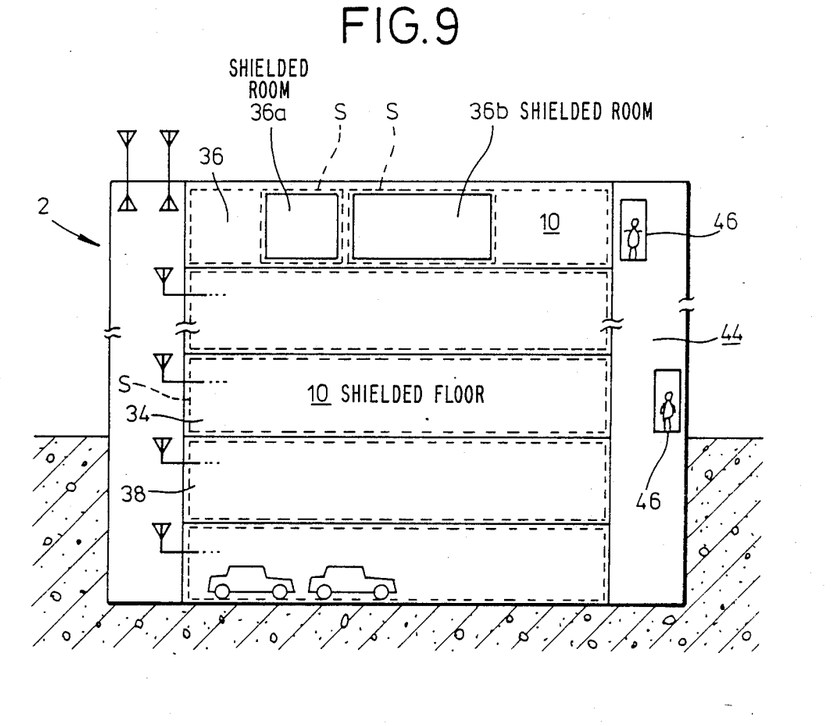
FIG. 9 is a schematic vertical cross-sectional view of a building which is electromagnetically shielded in its entirety and which has floors electrically shielded from each other and rooms on a floor that are electrically shielded from each other.

In the aforesaid embodiments, a building is electromagnetically shielded in its entirety. However, it is possible not only to electromagnetically shield a tall multistory building entirely but also to electromagnetically shield building floors or rooms on a certain floor independently. More specifically, as shown in FIG. 9, a first floor 34 is electromagnetically shielded at S from other floors of a building 2. More particularly, the walls, the floor panel, and the ceiling of the floor 4 are constructed of electrically conductive panels, or the wall members, the floor members, and the ceiling members are composed of electrically conductive panels or members coated with an electrically conductive paint and are assembled together. It is also possible to electromagnetically shield certain rooms 36a, 36b on a certain floor 36.

By electromagnetically shielding floors or rooms on a floor independently, radio waves of one frequency can be employed for different purpose in shielded spaces on the different floors or in the different rooms. Where floors are electromagnetically shielded from each other, radio waves of one frequency can be utilized on every other floor, for example, so that the radio waves of limited frequencies can effectively be employed in the building. In the event that the building 2 has an underground parking space such as on an underground floor 38, the shielded floors or rooms are protected against entry of noisy radio waves emitted from automobiles parked in the underground parking space, with the result that effective wireless communication can be effected in the shielded spaces.

Floor shields or partitions on a floor may be any of various electromagnetically different types including an electromagnetic transmission type, an electromagnetic absorption type, and an electromagnetic reflection type. Specifically, partitions in one office may be of the transmission type for using radio waves of one frequency for one purpose. Partitions on a floor used by small business entities may be of the absorption type or the reflection type.

Figure 10:
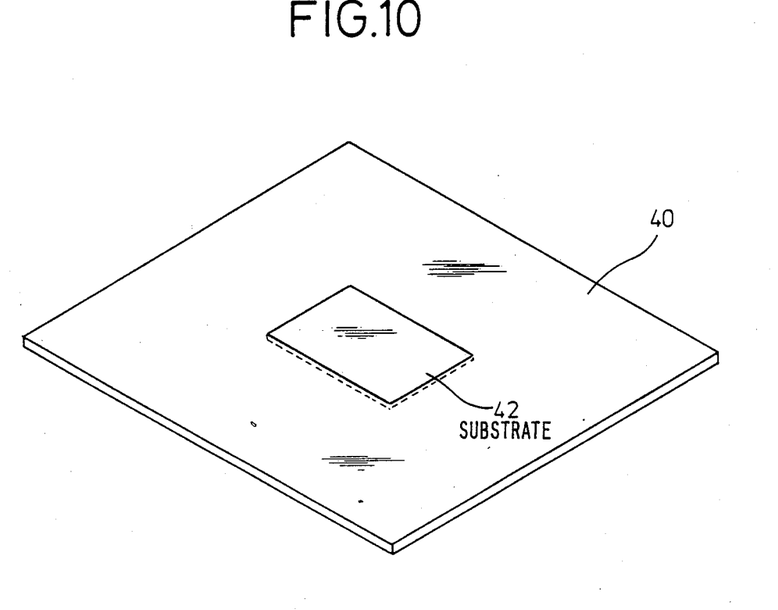
FIG. 10 is a perspective view of a ceiling panel in the form of a soft fiber board or insulation board with an antenna in the form of a dielectric substrate being mounted thereon.

When wireless communication is to be carried out using a radio wave of a certain frequency between floors or rooms 36a, 36b, for example, it is necessary to employ antennas. Preferably, such antennas should be in the form of panels mounted on ceiling members. As shown in FIG. 10, a dielectric substrate 42 made of polyethylene terephthalate and having a thickness of about 1.5 mm, with a metallic coating such as a plated coating of a thickness of about 0.2 mm thereon, is bonded to a ceiling member or panel which may comprise a soft fiber board or an insulation board for each of the floors 34, 36, 38 or each of the rooms 36a, 36b. It is also possible to provide a flat antenna structure having the same thickness as that of the ceiling panel board. The dielectric substrate 42 is electrically connected to an electromagnetic transmitter.

The panel-shaped antenna 42 mounted on the ceiling makes it possible to establish a communication system which is sightly and easy to assemble.

In the tall multistory building 2 shown in FIG. 9, people can move between the floors by an elevator. However, a space 44 in the building 2 in which the elevator is vertically movable would allow radio waves to pass therethrough from one floor to another floor. To eliminate such a shortcoming, the openings on the floors through which people can go into and out of the elevator are electromagnetically shielded. In case a plurality of elevators are employed, spaces occupied by the respective elevators are electromagnetically shielded so as to be electromagnetically independent, and the doors on the floors through which people can walk into and out of the elevators are also electromagnetically shielded for electromagnetic separation between the floors.

Figure 11:
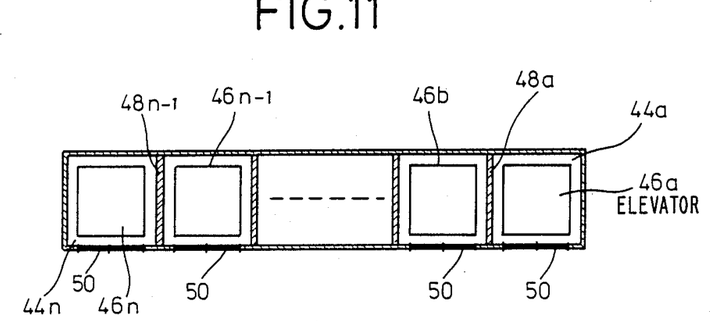
FIG. 11 is a horizontal cross-sectional view of an arrangement in which elevators and floors are electromagnetically shielded from each other in an electromagnetically shielded building according to the present invention.
Figure 12:
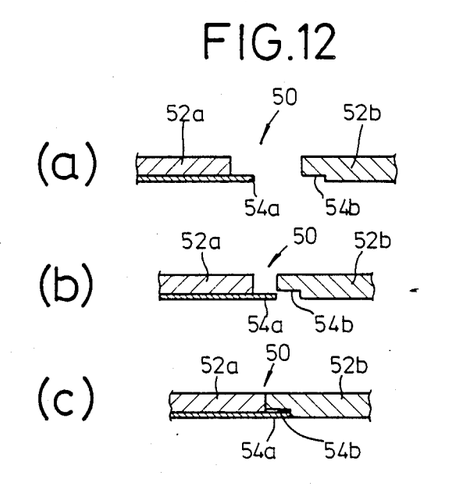
FIGS. 12(a), 12(b), and 12(c) are enlarged fragmentary cross-sectional views of the door of an elevator shown in FIG. 11.

FIGS. 11 and 12 show an embodiment directed to such electromagnetically shielded elevator spaces. As shown in FIG. 11, spaces 44a through 44n in which elevators 46a through 46n are vertically movably housed are electromagnetically shielded by respective walls 48a through 48n. Each of the walls 48a through 48(n−1) preferably comprises an electrically conductive panel, and is grounded. Elevator doors 50 for people to pass into and out of the elevators are also made of an electrically conductive mateial, and are grounded. As shown in FIGS. 12(a) through 12(c), each of the doors 50 includes a door member 52a having a projection 54a and another door member 52b having a recess 54b complementary to the projection 54a. When the door members 52a, 52b are moved from an open position (FIG. 12(a)) which allows people to go into and out of the elevator, to close the door 50, the door members 52a, 52b are temporarily stopped immediately before the door 50 is fully closed, as shown in FIG. 12(b). After safety has been confirmed, the door members 52a, 52b are brought together, closing the door 50, as shown in FIG. 12(c). At this time, the projection 54a is fitted into the recess 54b to electromagnetically shield the elevator. With this arrangement, safety is assured when people walk into and out of the elevators 46a through 46n, and the floors remain electromagnetically shielded from each other even when the elevator doors 50 are open.

Figure 13:
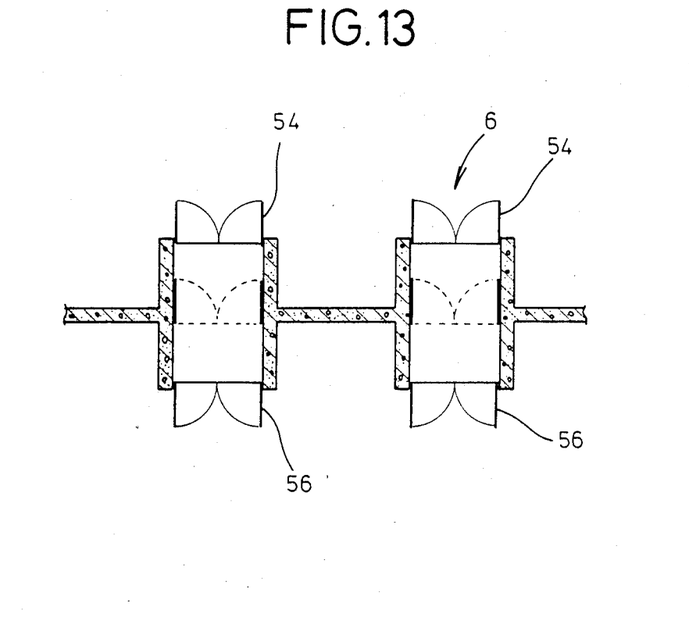
FIG. 13 is a horizontal cross-sectional view of doorways of an electromagnetically shielded building according to the present invention.
Figure 14:
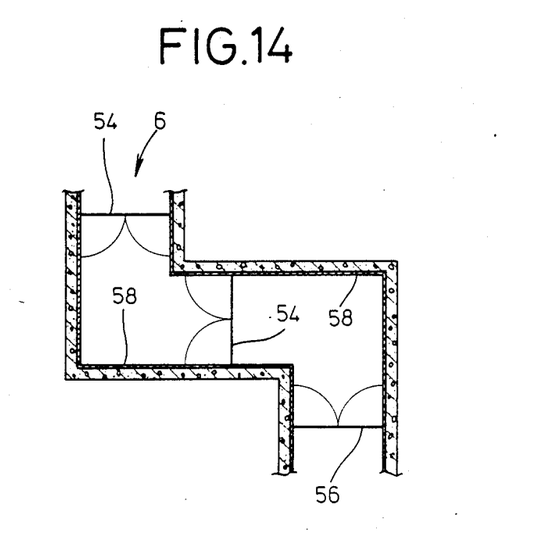
FIG. 14 is a horizontal cross-sectional view of a doorway according to another embodiment.

According to the present invention, moreover, not only the doors of the elevators 46a through 46n have electromagnetically shielding structures, but also doorways through which people can enter and leave the electromagnetically shielded builing 2 have electromagnetically shielding structures. As shown in FIG. 13, more specifically, a doorway 6 is composed of a first door 54 and a second door 56 which comprise electromagnetically shielding members. When entering or leaving the building 2 through the doorway 6, the first door 54 is opened while the second door 56 remains closed. After the first door 54 is closed, the second door 56 is opened. Since one of the doors 54, 56 remains closed at all times, no external radio waves find their way into the building 2 through the doorway 6, and radio waves used for wireless communication in the building 2 are prevented from leaking out through the doorway 6. As illustrated in FIG. 14, three successive doors may be used in one doorway 6, the arrangement being such that only one of the doors is openable at a time. Therefore, the electromagnetically shielding effect is doubled because two of the doors remain closed at all times. It is possible to bend the passage leading from one of the first doors 54 to the second door 56 and apply radio wave absorbing members to wall surfaces of the passage. The radio waves entering the bent passage are prevented from leaking out on account of their tendency to travel along a straight path, and are absorbed by the radio wave absorbing members.

Figure 15:
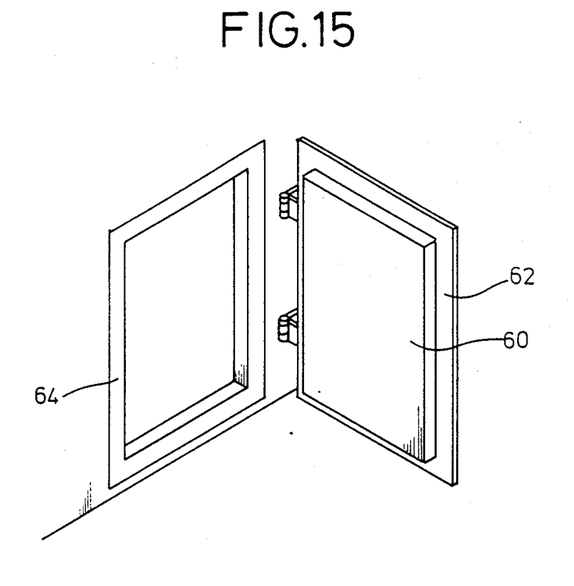
FIG. 15 is a perspective view of a single-swing door of a doorway in an electromagnetically shielded buidling.
Figure 16:
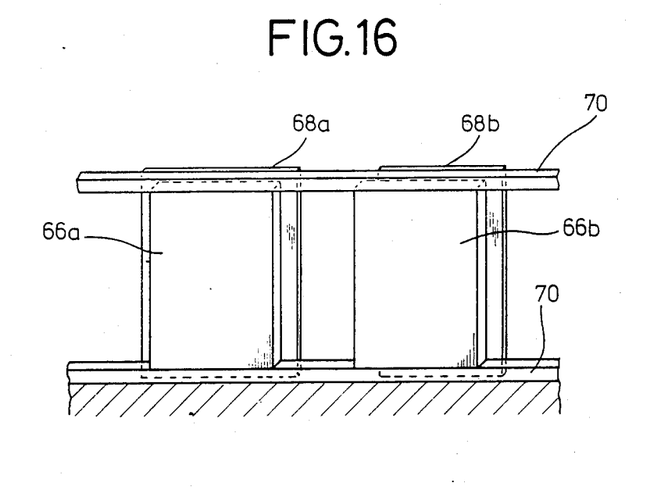
FIG. 16 is a perspective view of sliding doors of doorways in an electromagnetically shielded buidling.

FIGS. 15 and 16 illustrate by way of example doors having an electromagnetically shielding effect. In FIG. 15, a single-swing door comprises an ordinary door 60 and an electromagnetically shielding or electrically conductive panel 62 mounted on the door 60 in superposed relation. The panel 62 has outer peripheral edges extending beyond the outer peripheral edges of the door 60 by a distance of about 30 mm, for example, for thereby preventing radio waves from leaking out of the single-swing door through gaps between the door 60 and a door frame 64.

FIG. 16 shows sliding doors 66a, 66b to which electromagnetically shielding panels 68a, 68b are applied, respectively. The sliding doors 66a, 66b are slidable along a rail 70. The panel 68a on the sliding door 66a has peripheral edge portions projecting outwardly of outer peripheral edges of the door 66a. The panel 68b on the other sliding door 66b has a recess complementary to the confronting projecting peripheral edge portion of the panel 68a. Therefore, when the doors 66a, 66b are closed, the panels 68a, 68b are interfitted to prevent radio waves from leaking out between the doors 66a, 66b.

One specific example of wireless communication will be described which is effected within a building which is electromagnetically shielded in its entirety, has floors or rooms electromagnetically shielded from each other, and also has elevator entrance/exit openings electromagnetically shielded.

As shown in FIG. 2, n fixed antennas 72a through 72n for a central transmission/reception control apparatus 74 are disposed on a ceiling, for example, of a floor 10 which is surrounded by electromagnetically shielding outer walls 16 and window panes 14 of glass. The antennas 72a through 72n may be incorporated in respective ceiling members 40 (see FIGS. 2 and 10). The central transmission/reception control apparatus 74 is fixedly placed on the floor 10, for example, and includes a wireless device 76, a control indicator 78, and an exchange/distribution connector circuit 80. The antennas 72a through 72n and the wireless device 76 are interconnected by cables 82. To the exchange/distribution connector circuit 80, there may be coupled an external singal line 84 such as a cable or an optical fiber for permitting desired communication with the floor 10 from an external source.

As many as m transmission/reception terminal devices 88 having antennas 86 are placed on the floor 10. The transmission/reception terminal devices 88 may include a pocket bell 90, a portable wireless telephone set 92, a radio receiver 94, a television receiver 96, etc. The transmission/reception terminal devices 88 may also include cordless telephone sets such as a rotary dial telephone set or push-button dial telephone set, a facsimile transmitter/reciever, a computer terminal, a display, etc. The radio receiver, the television receiver, the facsimile transmitter/receiver, the computer terminal, the pocket bell, the cordless telephone set, the portable wireless telephone set, and the display may be used as mobile units on the floor 10. These terminal devices are also placed on other floors.

Communication in the building 2 according to the present invention includes communication on the floor 10 and communication with other floors and the exterior of the building 2.

First, communication on the floor 10 will be described below.

Call singals from the portable wireless telephone set, the cordless telephone set, the facsimile transmitter/receiver, the computer teminnal, and other terminal devices are transmitted via the antennas 86 and received by the antennas 72a through 72n. The call signals are then supplied via the cables 82 to the central transmission/reception control apparatus 74 in which the signals are fed via the receiver of the wireless device 76 to the exchange/distribution connector circuit 80. The circuit 80 then determines that the incoming call signal represents floor communication, and gives an indication on the control indicator 78 and simultaneously connects the signal to the transmitter of the wireless device 76, whereupon a communication network is established. The signals are now delivered from the wireless device 76 via the cables 82 and the antennas 72a through 72n to receiver terminal devices. Other signals received from external terminal devices such as a pocket bell, a radio receiver, a television receiver, and the like are supplied to the central transmission/reception control apparatus 74 in which the signals are fed through the exchange/distribution connector circuit 80 to the control indicator 78 on which the signals are indicated. At the same time, the signals are fed via the wireless device 76 and the antennas 72a through 72n to the receiver terminal devices, i.e., the pocket bell 90, the radio receiver 92, the television receiver 96, and the like.

Communication between the terminal devices can thus be made possible by the communication network. Communication with a source outside of the floor 10 or the building 2 is effected by decoding a call signal from a terminal device 88 for communication outside of the floor or the building, and delivering the signal through a modem in the central transmission/reception control apparatus 74 and the signal line 84 to a desired floor or building. Communication with a source outside of the floor 10 or the building 10 is then possible in the same manner as that of communication on the same floor 10 or in the same building 2.

Figure 17:
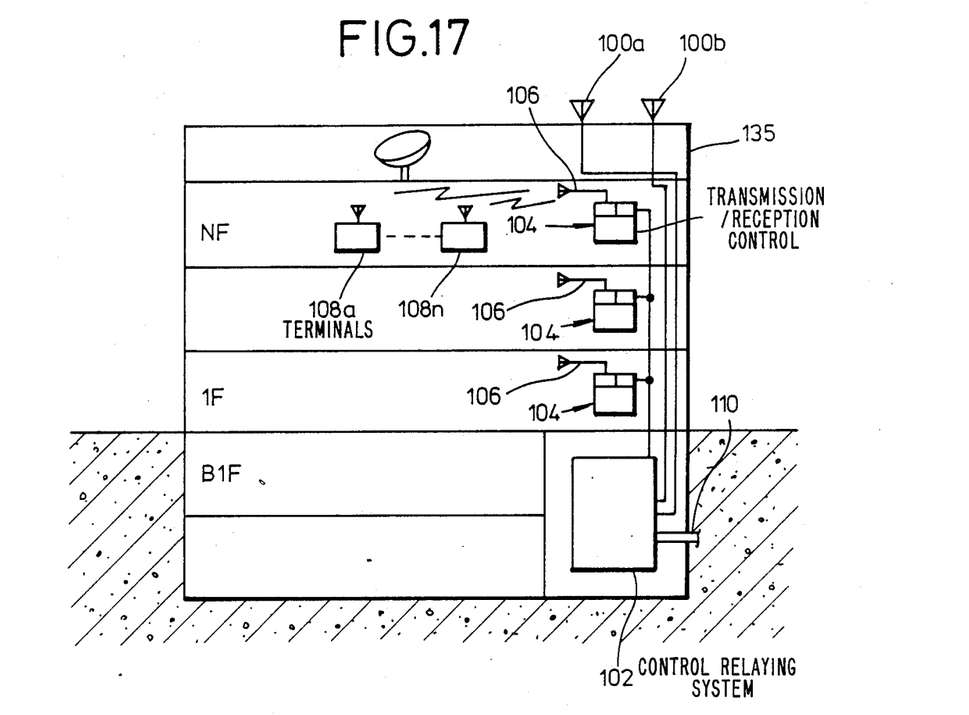
FIG. 17 is a schematic vertical cross-sectional view of a building that is electromagnetically shielded in its entirety, showing the manner in which wireless communication is carried out between floors.

FIG. 17 shows another embodiment in which communication is effected between floors of a building which is electromagnetically shielded in its entirety. The building has a transmission antenna 100a and a reception antenna 100b which are located out of the building. Radio waves are transmitted and received by a central control relaying system 102 through the transmission antenna 100a and the reception antenna 100b, respectively. The radio waves are transmitted from and received by central transmission/reception control apparatus 104 disposed on respective floors of the building. Communication with terminals 108a through 108n on each floor is effected through an antenna 6 in the building. An external signal line 110 is connected to the central control relaying system 102 and used for communication with another building. The external signal line 110 is connected to the other building through a telephone office. The transmission and reception antennas 100a, 100b may be replaced with a single transmission/reception antenna.

Figure 18:
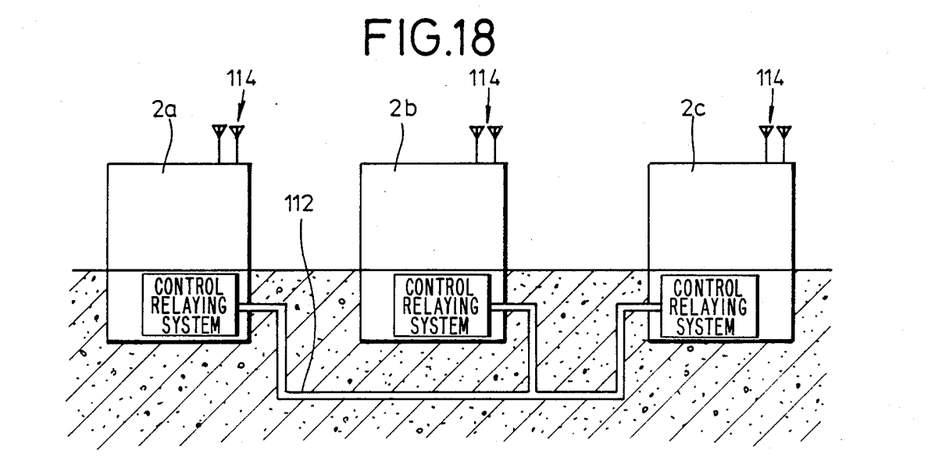
FIG. 18 is a vertical cross-sectional view of a plurality of electromagnetically shielded buildings between which wireless communication is effected while the spaces in all of the buildings are being commonly used.

FIG. 18 illustrates still another embodiment in which the spaces in a plurality of different electromagnetically shielded buildings 2a through 2c can be used as a common space. An external signal line 112 which comprises a metallic cable or an optical fiber cable interconnects the buildings 2a through 2c for utilizing the spaces of the buildings 2a through 2c as a common space. The buildings 2a through 2c are interconnected for wireless communication by antennas 114 on the roofs of the buildings.

Figure 19:
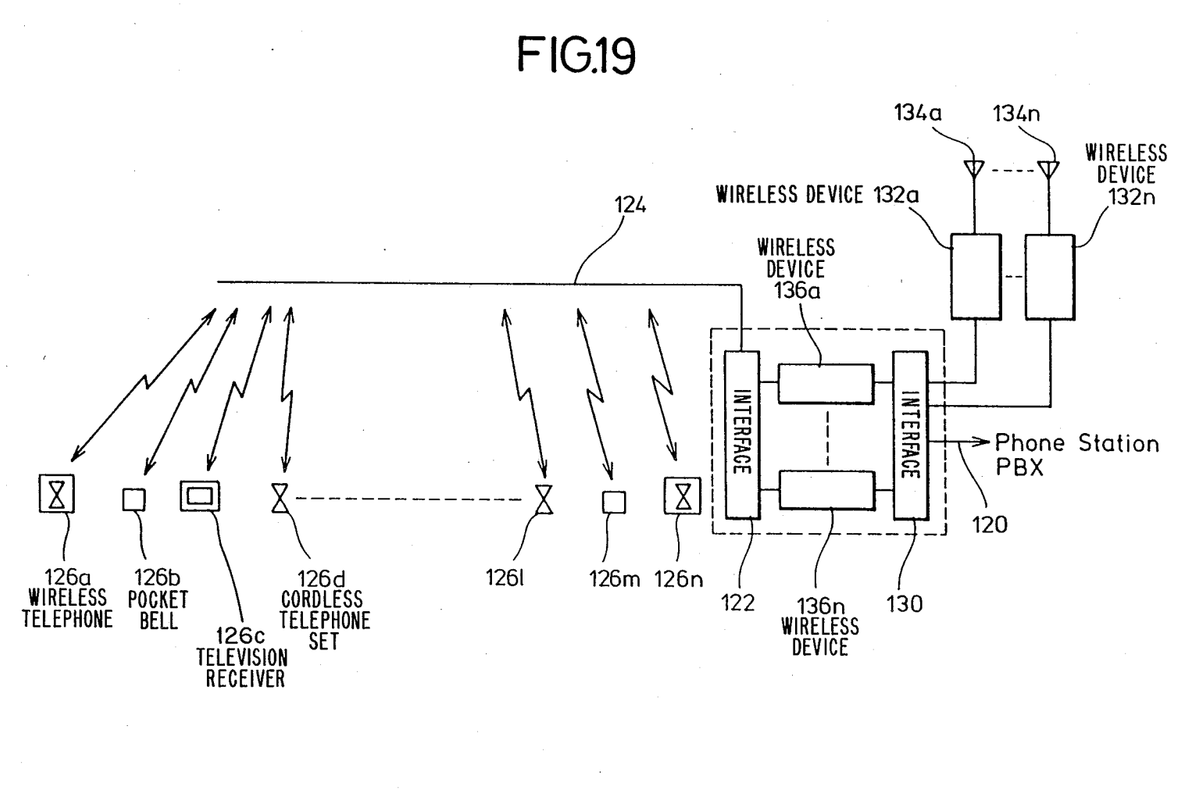
FIG. 19 is a schematic view of a wireless communication system in an electromagnetically shielded building.

FIG. 19 shows a wireless communication system in an electromagnetically shielded building according to a further embodiment of the present invention. An external signal line 120 comprises a metallic cable or an optical fiber cable interconnecting the building and a telephone office or a PBX in another electromagnetically shielded building such as shown in FIG. 17.

An interface 122 is connected to a radio wave leakage cable 124 which allows communication with various terminals such as a portable wireless telephone set 126a, a pocket bell 126b, a television receiver 126c, and cordless telephone sets 126d through 126n. An interface 130 serves to relay signals between antennas 134a through 134n of wireless devices 132a through 132n located outside of the buidling and wireless devices 136a through 136n which are provided for communication within the building. The antennas 134a through 134n may be satellite antennas, and the wireless devices 132a through 132n may be satellite wireless devices. Where the antennas 134a through 134n are satellite antennas, the roof and outer walls of the building are surrounded by an electromagnetically shielding member 135 and the antennas 134a through 134n are directed and extended upwardly to prevent interference with other satellite antennas on the roof of another building.

The radio waves that can be used in the aforesaid embodiments are not limited to certain frequencies and transmission powers since the floors and rooms of the building are electromagnetically shielded from each other. Therefore, communication can be made in various ways using one radio wave frequency in spaces which are electromagnetically shielded from the exterior spaces. Any wiring for the terminals are not required because of the employment of various modulation methods. Since various terminals can be moved on one floor, within one room, or in one building for communication to suit desired business needs, any wiring works would not be necessary unlike wire communication systems. As a result, the cost of the communication system is lowered, and communication is not disturbed which would otherwise be impaired by radio wave disturbances such as interference.

Although certain preferred embodiments have been shown and described, it should be understood that many changes and modifications may be made therein without departing from the scope of the appended claims.

What is claimed is:

1. A structure for wireless communication in an electromagnetically shielded building, comprising an outer wall made of an electromagnetic shielding material, a ceiling member incorporating an antenna, and a window comprised of a glass pane including an electromagnetic shielding member, wherein said outer wall and said window jointly define an electromagnetically shielded space, said outer wall comprising an electrically conductive material and being connected to ground, said outer wall and said window being electrically connected to each other, wireless transmission/reception means disposed in said electromagnetically shielded space, and said electromagnetically shielded space including therein an electromagnetically shielded subspace on each floor or each room on a floor of the building, the arrangement being such that wireless communication can be effected with radio waves in a selected frequency range within said space between the wireless transmission/reception means and said antenna.

2. A structure according to claim 1, wherein said electromagnetic shielding member is coated as a layer on a surface of said glass pane, said glass pane being supported by a window frame made of an electrically conductive material, said electromagnetic shielding member and said window frame being electrically connected to each other.

3. A structure according to claim 2, wherein said glass pane is fixed to said outer wall by an adhesive including an electrically conductive material.

4. A structure according to claim 3, wherein said outer wall has a recess or a step and said glass pane has a projection or a step, said window being fixed to said outer wall by holding said projection or said step and said recess or said step in interfitting relationship.

5. A structure according to claim 1, wherein said electromagnetic shielding member comprises an electrically conductive punched metal plate sandwiched between two glass panes of the window, said glass panes being supported by a window frame made of an electrically conductive material, said punched metal plate and said window frame being electrically connected to each other.

6. A structure according to claim 1, wherein said electromagnetic shielding member is mixed in said glass pane, said glass pane being supported by a window frame made of an electrically conductive material, said glass pane and said window frame being electrically connected to each other.

7. A structure according to claim 1, wherein said electromagnetic shielding member comprises an electrically conductive net embedded in said glass pane, said glass pane being supported by a window frame made of an electrically conductive material, said net and said window frame being electrically connected to each other.

8. A structure according to claim 1, further comprising an entrance/exit opening for entering and leaving said space having an electromagnetic shielding construction.

9. A structure according to claim 8, wherein said entrance/exit opening comprises a first door and a second door, one of said first and second doors being closed when passing through said entrance/exit opening.

10. A structure according to claim 9, wherein each of said first and second doors comprises a door member and an electromagnetic shielding panel mounted on said door member for preventing radio waves from leaking out when the doors are closed.

11. A structure according to claim 1, further including an elevator movably disposed in said electromagnetically shielded space, and an electromagnetic shielding door disposed on a floor of the building where said elevator can be stopped.

12. A structure according to claim 11, wherein there are a plurality of elevators, further including electromagnetic shielding walls each disposed between adjacent ones of the elevators.

13. A structure according to claim 1, wherein said electromagnetic shielding member is made of an oxide of indium tin.

14. A structure according to claim 1, wherein said electromagnetic shielding member is made of a nickel-acryl paint.

15. A structure according to claim 1, further including an electromagnetic shield extending upwardly from the roof of the building, and a satellite antenna disposed in a space surrounded by said electromagnetic shield above said roof of the building.

* * * * *